United States Patent
Khan

(10) Patent No.: US 7,280,581 B2
(45) Date of Patent: Oct. 9, 2007

(54) METHOD OF ADAPTIVE WALSH CODE ALLOCATION

(75) Inventor: Farooq Ullah Khan, Manalapan, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 758 days.

(21) Appl. No.: 10/435,966

(22) Filed: May 12, 2003

(65) Prior Publication Data

US 2004/0229628 A1    Nov. 18, 2004

(51) Int. Cl.
*H04L 27/30* (2006.01)

(52) U.S. Cl. .................. 375/141; 375/146; 375/343

(58) Field of Classification Search ............ 375/130, 375/141, 140, 142, 146, 147, 150
See application file for complete search history.

(56) References Cited

U.S. PATENT DOCUMENTS

| | | | | |
|---|---|---|---|---|
| 6,091,757 A | * | 7/2000 | Cudak et al. | 375/130 |
| 6,118,983 A | * | 9/2000 | Egusa et al. | 455/69 |
| 6,577,671 B1 | * | 6/2003 | Vimpari | 375/146 |
| 6,754,169 B2 | * | 6/2004 | Baum et al. | 370/204 |
| 2004/0203823 A1 | * | 10/2004 | Harris | 455/452.1 |
| 2005/0265496 A1 | * | 12/2005 | Johansson et al. | |

FOREIGN PATENT DOCUMENTS

| | | |
|---|---|---|
| EP | 1061680 | 12/2000 |
| EP | 1117184 | 7/2001 |
| EP | 1213868 | 6/2002 |
| WO | WO 00/33476 | 6/2000 |
| WO | WO 00/65860 | 11/2000 |

OTHER PUBLICATIONS

3rd Generation Partnership Project 2: "Physical Layer Standard for cdma2000 Spread Spectrum Systems", 3GPP2 C.S0002, (Jun. 15, 2000), pp. 2-55, line 1; pp. 2-58, line 21; pp. 3-4, line 1; pp. 3-7, line 7; pp. 3-38, line 1; pp. 3-69.
European Search Report.
U.S. Appl. No. 09/936,104, filed Feb. 28, 2000, Cao.
International Search Report.

* cited by examiner

*Primary Examiner*—Dac V. Ha

(57) ABSTRACT

A method of adaptive Walsh code allocation in a wireless communication system. The method includes the step of each voice user transmitting quality condition signal, such as a pilot signal strength measurement to a corresponding base station. Upon receiving each quality condition signal, the method includes determining a spreading factor for each voice user in response to its quality condition signal. A Walsh code is thereafter allocated to each voice user in response to the determined corresponding spreading factor. Thus, for example, if the quality condition signal of a first voice user is relatively higher than the quality condition signal of a second voice user, the spreading factor allocated to the first voice user should be longer than the spreading factor of the second voice user.

16 Claims, 5 Drawing Sheets

| Information bits | Voice frame size | Frame Quality Indicator | Tail | Total bits | Modulation | Repetition | Puncturing rate | Coding rate |
|---|---|---|---|---|---|---|---|---|
| Current RC3 [64-ary Walsh code] | | | | | | | | |
| 16 | 1/8th rate | 6 | 8 | 30 | QPSK | 8 | 4/5 | 1/4 |
| 40 | Quarter-rate | 6 | 8 | 54 | QPSK | 4 | 8/9 | 1/4 |
| 80 | Half-rate | 8 | 8 | 96 | QPSK | 2 | 1 | 1/4 |
| 172 | Full-rate | 12 | 8 | 192 | QPSK | 1 | 1 | 1/4 |
| Enhanced RC (ERCa) [128-ary Walsh code] | | | | | | | | |
| 16 | 1/8th rate | 6 | 8 | 30 | QPSK | 4 | 4/5 | 1/4 |
| 40 | Quarter-rate | 6 | 8 | 54 | QPSK | 2 | 8/9 | 1/4 |
| 80 | Half-rate | 8 | 8 | 96 | QPSK | 1 | 1 | 1/4 |
| 172 | Full-rate | 12 | 8 | 192 | QPSK | 1 | 1 | 1/2 |
| Enhanced RC (ERCb) [256-ary Walsh code] | | | | | | | | |
| 16 | 1/8th rate | 6 | 8 | 30 | QPSK | 2 | 4/5 | 1/4 |
| 40 | Quarter-rate | 6 | 8 | 54 | QPSK | 1 | 8/9 | 1/4 |
| 80 | Half-rate | 8 | 8 | 96 | QPSK | 1 | 1 | 1/2 |
| 172 | Full-rate | 12 | 8 | 192 | 16-QAM (8-PSK) | 1 | 1 | 1/2 (2/3) |

FIG. 3

METHOD OF ADAPTIVE WALSH CODE ALLOCATION

BACKGROUND OF THE INVENTION

I. Field of the Invention

The present invention relates to telecommunications, and more particularly, to wireless communications.

II. Description of the Related Art

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell is further broken into two or more sectors. Each cell is commonly divided into three sectors, each having a range of 120 degrees, for example.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center ("MSC"). A mobile switching center is responsible for, among other things, establishing and maintaining calls between the wireless units, between a wireless unit and a wireline unit through a public switched telephone network ("PSTN"), as well as between a wireless unit and a packet data network ("PDN"), such as the Internet. A base station controller ("BSC") administers the radio resources for one or more base stations and relays this information to the MSC.

When active, a wireless unit receives signals from at least one base station or cell site over a forward link or downlink and transmits signals to at least one cell site or base station over a reverse link or uplink. There are many different schemes for defining wireless links or channels for a cellular communication system. These schemes include, for example, time-division multiple access ("TDMA"), frequency-division multiple access ("FDMA"), and code-division multiple access ("CDMA") type-designs.

In a CDMA scheme, each wireless channel is distinguished by a distinct channelization code (e.g., spreading code, spread spectrum code or Walsh code) that is used to encode different information streams. These information streams may then be modulated at one or more different carrier frequencies for simultaneous transmission. A receiver may recover a particular stream from a received signal using the appropriate Walsh code to decode the received signal.

Each base station using a spread spectrum scheme, such as CDMA, offers a determined number of Walsh codes, and consequently, a corresponding number of users, within each sector of a cell. In the CDMA 2000 1X, for example, the number of Walsh codes made available by each sector may be defined by the radio configuration ("RC") employed by the base station. Consequently, the number of Walsh codes available for an RC3 assignment is 64, for example, while an RC4 assignment, in contrast, supports 128 Walsh codes. Under certain conditions, such as when the majority of users are in benign RF environment, the users are concentrated in the area near antenna or majority of the users are stationary, etc., the capacity of CDMA 2000 1X may exceed the Walsh code capability of an RC3 assignment. RC3 assignments may also be exceeded when technologies, such as transmit diversity, an intelligent antenna(s), and/or a selectable mode vocoder(s) are introduced.

The number of Walsh codes made available by a base station takes into consideration the transmit power requirements associated with the selected RC assignment. For example, an RC4 assignment requires a relatively longer spreading code and has a greater transmit power requirement than an RC3 assignment, which may be a relatively shorter spreading code. Thusly, while increasing the number of Walsh codes by selected a higher RC assignment on the downlink may increase voice capacity, the robustness of the modulation may be reduced. For the purposes of the present disclosure, reference to voice capacity also includes circuit switched services similar to voice, such as video, for example. An RC4 assignment may therefore degrade capacity, for example, by supporting a weaker coding rate than an RC3 assignment.

To maintain the efficacy of the base station's operation, an increase in the signal to noise ratio ("SNR") may be needed if a higher RC assignment may be selected. To raise the SNR, however, an increase in transmit power may also be necessary. Consequently, a tradeoff exists between the power efficiency of the base station based on the RC configuration employed and the length/number of spreading codes made available within each sector of a cell.

As a result, a need exists for increasing voice capacity on the downlink without unduly influencing the power efficiency of the base station.

SUMMARY OF THE INVENTION

The present invention provides a method of increasing voice capacity on the downlink without unduly influencing power efficiency. More particularly, the present invention provides a method of adaptive Walsh code allocation, including, for example, determining a spreading factor for voice users in a wireless communication system in response to the quality of the channel conditions of each voice user. Once the spreading factor may be determined for each voice user, a Walsh code may be allocated to each user.

In one exemplary embodiment of the present invention, a quality condition signal, such as a pilot signal strength measurement, may be received corresponding with each voice channel of a plurality of voice channels. The quality condition signal comprises a static condition measurement, and may be received by a base station, for example. Thereafter, a spreading factor may be determined for each voice channel in response to each voice channel's corresponding quality condition signal. The spreading factor may correspond with a number of Walsh codes. As such, each allocated spreading factor may correspond with one of a plurality of radio configurations, including, for example, RC1, RC2, RC3 and/or RC4. A Walsh code may subsequently be allocated to each voice channel based on the determined corresponding spreading factor. Thus, if the quality condition signal of a first voice channel is relatively higher than the quality condition signal of a second voice channel, the spreading factor allocated to the first voice channel should be longer than the spreading factor of the second voice channel.

In another exemplary embodiment of the present invention, a quality condition signal comprising a static condition measurement, such as a pilot signal strength measurement, may be transmitted from each of a plurality of voice users. Thereafter, a determined spreading factor may be received by each voice user in response to its quality condition signal. The determined spreading factor may correspond with one of a plurality of radio configurations, such as RC1, RC2, RC3 and/or RC4, for example. A Walsh code allocation for each voice user may be received by each corresponding voice user based on the determined corresponding spreading factor received. Therefore, if the quality condition signal of a first voice user is relatively higher than the quality condition signal of a second voice user, the spreading factor allocated to the first voice user should be longer than the spreading factor of the second voice user.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below:

FIG. 3 depicts an exemplary aspect of an embodiment of the present invention;

Figure 1:
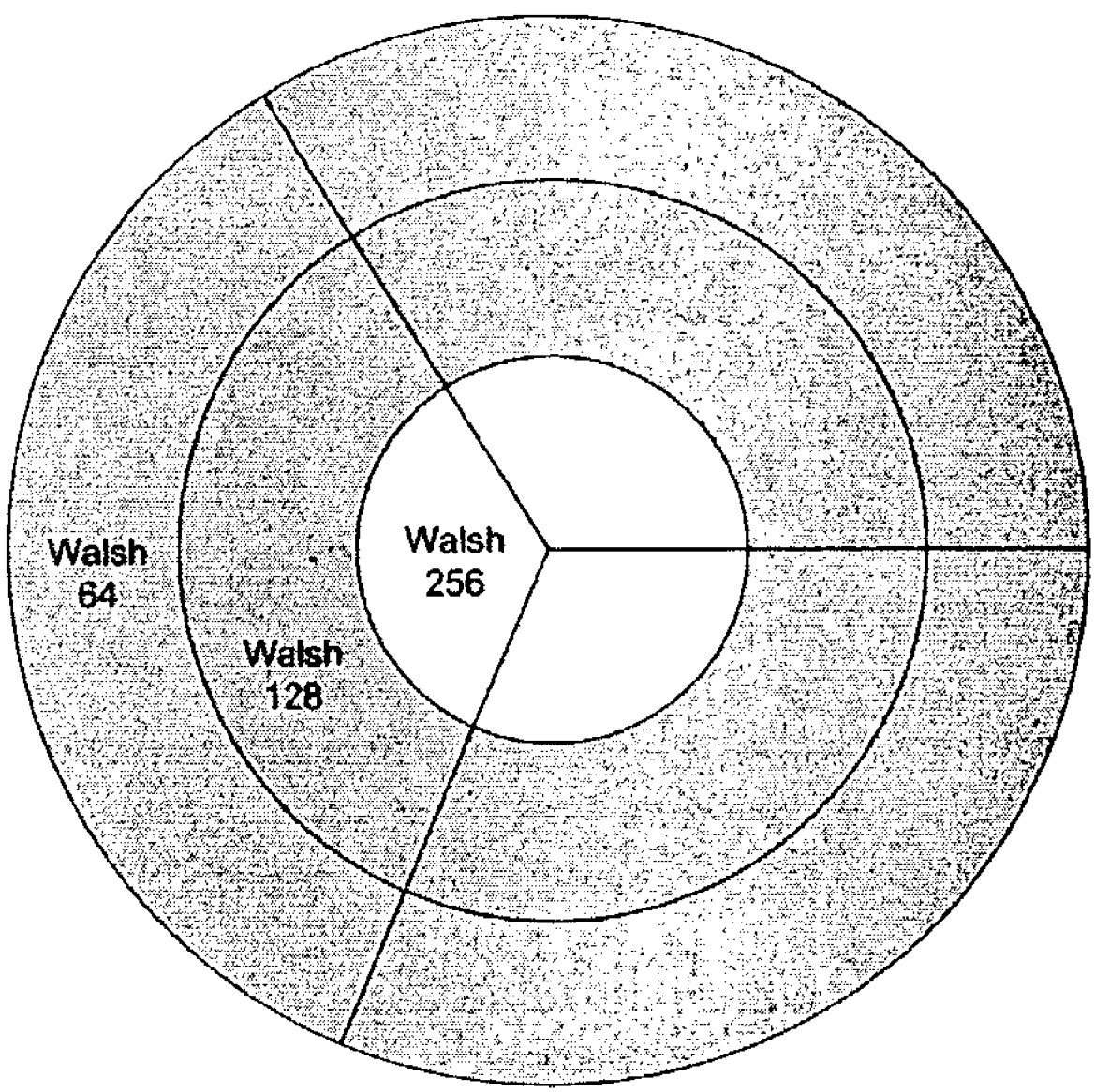
FIG. 1 depicts a graphical illustration of an embodiment of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

In current wireless systems employing the CDMA-based technology, orthogonal Walsh codes may be allocated for voice channels to different users. On the downlink, the total Walsh space may be shared between all the users on the carrier. In the uplink direction, all the Walsh space may be available to a given user. In general, Walsh codes with fixed spreading factor may be allocated to different users. For example, in a CDMA 2000 1x, a radio configuration 3 ("RC3") uses a spreading factor of 64, while a radio configuration 4 ("RC4") uses a spreading factor of 128 in the downlink. A Walsh code with a given spreading factor may be allocated at the time of call set up for the duration of the call of each user. For users in soft handoff ("SHO"), a Walsh code may be allocated from each sector in the active set. For the purposes of the present disclosure, an active set may consist of sector(s) with which each user may be in communication simultaneously.

The capacity of a CDMA system on the downlink may be hard limited by the number of Walsh codes available. For example, only a total of 64 codes of spreading factor 64—or alternatively, 128 codes of spreading factor 128—may be available. Some of these codes may be used for control channels, such as pilot and paging channels. Moreover, codes from multiple sectors may need to be allocated for users in SHO. This may limit the number of simultaneous voice calls that a base station might be able to support.

In view of the above, the present invention provides a method of increasing voice capacity on the downlink without unduly influencing the power efficiency. More particularly, the present invention provides a method of adaptive Walsh code allocation, including, for example, determining a spreading factor for voice users in a wireless communication system in response to the quality of the channel conditions of the voice user. Once the spreading factor may be determined for a voice user, a Walsh code may be allocated to that user.

The present invention provides an adaptive orthogonal Walsh code allocation scheme. In so doing, the method promotes the efficient utilization of the Walsh space on the downlink to increase the number of simultaneously active voice calls that can be supported in the sector. The method also supports the efficient utilization of the available power in the base station resulting in greater overall system capacity. Moreover, the method advances reduced intercell and intracell interference to further promote increase system capacity.

In one embodiment of the present invention, the method includes the step of receiving one or more quality condition signals from each voice channel. This embodiment reflects the activities that may occur at the base station or base station controller, for example. Here, a voice channel may correspond to the communication link between a voice user through a wireless unit and one or more base stations. Each quality condition signal may comprise a station condition measurement, such as a pilot signal strength measurement, for example.

Once the quality of each voice channel is established through the receipt of the quality condition signals, a spreading factor for each voice channel may be determined. The spreading factor for each voice channel is determined by considering the corresponding quality condition signal. Thereafter, a Walsh code may be allocated to each voice channel in response to the determined corresponding spreading factor. Each allocated spreading factor may correspond with one of a number of radio configurations, including RC1, RC2, RC3 and RC4, for example.

In another embodiment of the present invention, the method includes transmitting one or more quality condition signals from each voice user. This embodiment reflects the activities that may occur at the wireless unit, for example. Each quality condition signal may comprise a station condition measurement, such as a pilot signal strength measurement, for example.

With the quality of each voice channel established through the receipt of the quality condition signals, a determined spreading factor may be received by each voice user in response to its quality condition signal. The determined spreading factor may corresponding with one of a plurality of radio configurations, such as RC1, RC2, RC3 and/or RC4, for example. A Walsh code allocation for each voice user may be received by each corresponding voice user based on the determined corresponding spreading factor. Thus, for example, if the quality condition signal of a first voice user is relatively higher than the quality condition signal of a second voice user, the spreading factor allocated to the first voice user should be longer than the spreading factor of the second voice user.

In an example of the present invention, a plurality of voice channels includes a first, a second and a third voice channel or user. A quality condition signal is received for each voice channel or user. The quality condition signal in the present example is relatively higher than the quality condition signals for the second and third voice channel or user, while the quality condition signal received for the second voice channel is also lower relative to the quality condition signal of the third voice channel. Consequently, the spreading factor of the first voice channel may be determined to be longer than the spreading factor of the second voice channel, and the spreading factor of the third voice channel may be determined to be longer than the spreading factor of the second voice channel yet and shorter than the spreading factor of the first voice channel.

As noted hereinabove, using an adaptive Walsh code allocation approach, voice users with relatively high quality channels may be allocated a higher spreading factor ("SF") Walsh codes ("WCs") than voice users with relatively lower quality channels. This may result in weaker coding and may promote use of higher order modulations (e.g., higher required $E_b/N_t$ to achieve the same frame error rate or "FER"). However, users with relatively weaker channels may be allocated lower SF WCs. The use of lower SFs should allow more robust modulation and coding, and, therefore require lower $E_b/N_t$.

Minimizing the base station power fraction ($E_c/I_{or}$) required for relatively weak users demanding power may result in greater overall savings of $E_c/I_{or}$, for example. These potential savings may be then allocated to other uses, thereby increasing the overall system capacity. This may be understood by means of the following exemplary scenario. If two users, A and B, are in the system, and user A is at a geometry ($I_{or}/I_{oc}$) of 0.0 dB (e.g., a 'bad' user), while user B is at a geometry ($I_{or}/I_{oc}$) of 10 dB (e.g., a 'good' user). The relationship between the power fraction, geometry, PG and $E_b/N_t$ may be expressed by the following mathematical equation:

$$\frac{E_c}{I_{or}} = \frac{E_b}{N_t} - PG - \frac{\hat{I}_{or}}{I_{oc}}$$

where $E_c/I_{or}$ is the base station power fraction, $E_b/N_t$=5 dB and PG=18 dB. As a result, the necessary power fraction may be calculate for the users A and B, as follows:

Power fraction ($E_c/I_{or}$) for user A=5.0%
Power fraction ($E_c/I_{or}$) for user B=0.5% where $E_c/I_{or}$ is the base station power fraction. Therefore, decreasing $E_b/N_t$ of user A by 3dB through more robust coding and modulation (higher SF Walsh code) may save about 2.5% of power, while increasing $E_b/N_t$ of user B by 3 dB using a less robust modulation and coding (lower SF Walsh code) may increase the power by about 0.5%. Therefore, adaptive Walsh code allocation may increase the overall Walsh utilization and RF performance of the system if users at relatively 'bad' geometries are allocated lower SF Walsh codes (e.g., requiring relatively lower $E_b/N_t$) while users at relatively 'good' geometries allocated higher SF codes (e.g., requiring relatively higher $E_b/N_t$).

Referring to FIG. 1, an example of an adaptive Walsh code allocation is shown. Here, users closer to the base station (e.g., relatively 'good' users) may be allocated relatively higher SF Walsh codes. Moreover, users farther away from the base station (e.g., relatively 'bad' users) may be allocated relatively lower SF Walsh codes.

Figure 2:
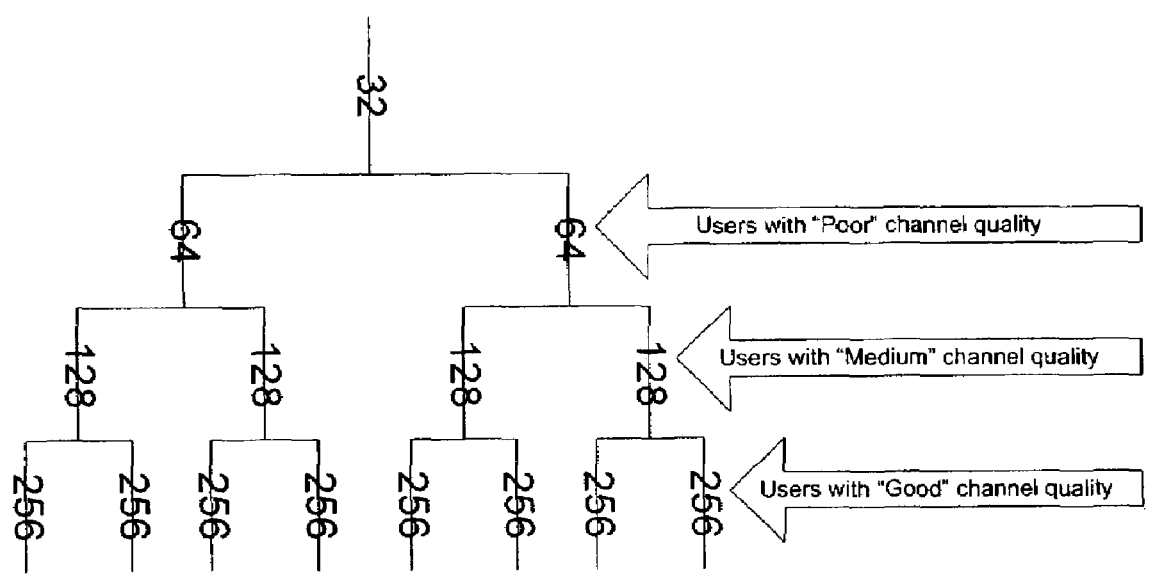
FIG. 2 depicts an example of the present invention.

An example of Walsh code allocation to users with different channel qualities and a table of radio configurations having differing length Walsh codes are depicted in FIGS. 2 and 3. As illustrated, lower spreading factor Walsh codes, such as 64 length Walsh codes, for example, may allow for use of more robust modulation and coding. Therefore, lower spreading factor Walsh codes may be allocated to users with poorer channel qualities.

On the other hand, higher spreading factor Walsh codes, such as length 256 Walsh codes, for example, may create more Walsh channels. This, however, may require use of less robust modulation and coding. Therefore, these higher spreading factors codes may be allocated to users with relatively high channel qualities—e.g., users that can support a less robust modulation and coding with reasonable amount of base station power fraction. In one scenario, these higher spreading factors codes may be allocated to users with relatively high channel qualities exclusively.

Figure 4:
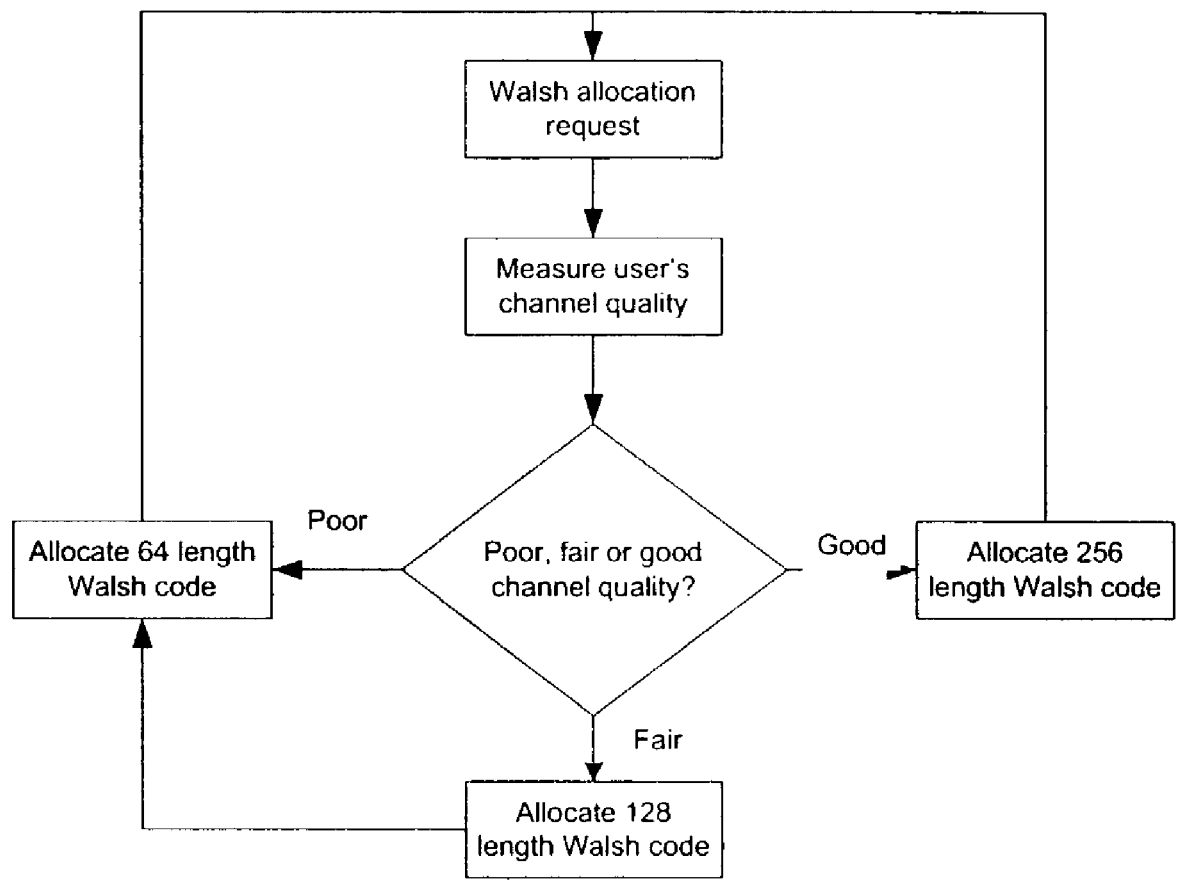
FIG. 4 depicts a flow chart of an embodiment of the present invention.

Referring to FIG. 4, an exemplary flow chart of another embodiment of the present invention is illustrated. More particularly, the exemplary flow chart of FIG. 4 depicts the allocation of Walsh codes based on users' channel quality signal information. Here, the channel quality for a wireless unit may be determined either based on the downlink pilot strength measurements that the wireless unit reports back to the base station or some explicit indication of the channel quality fed back by the wireless unit to the base station.

Figure 5:
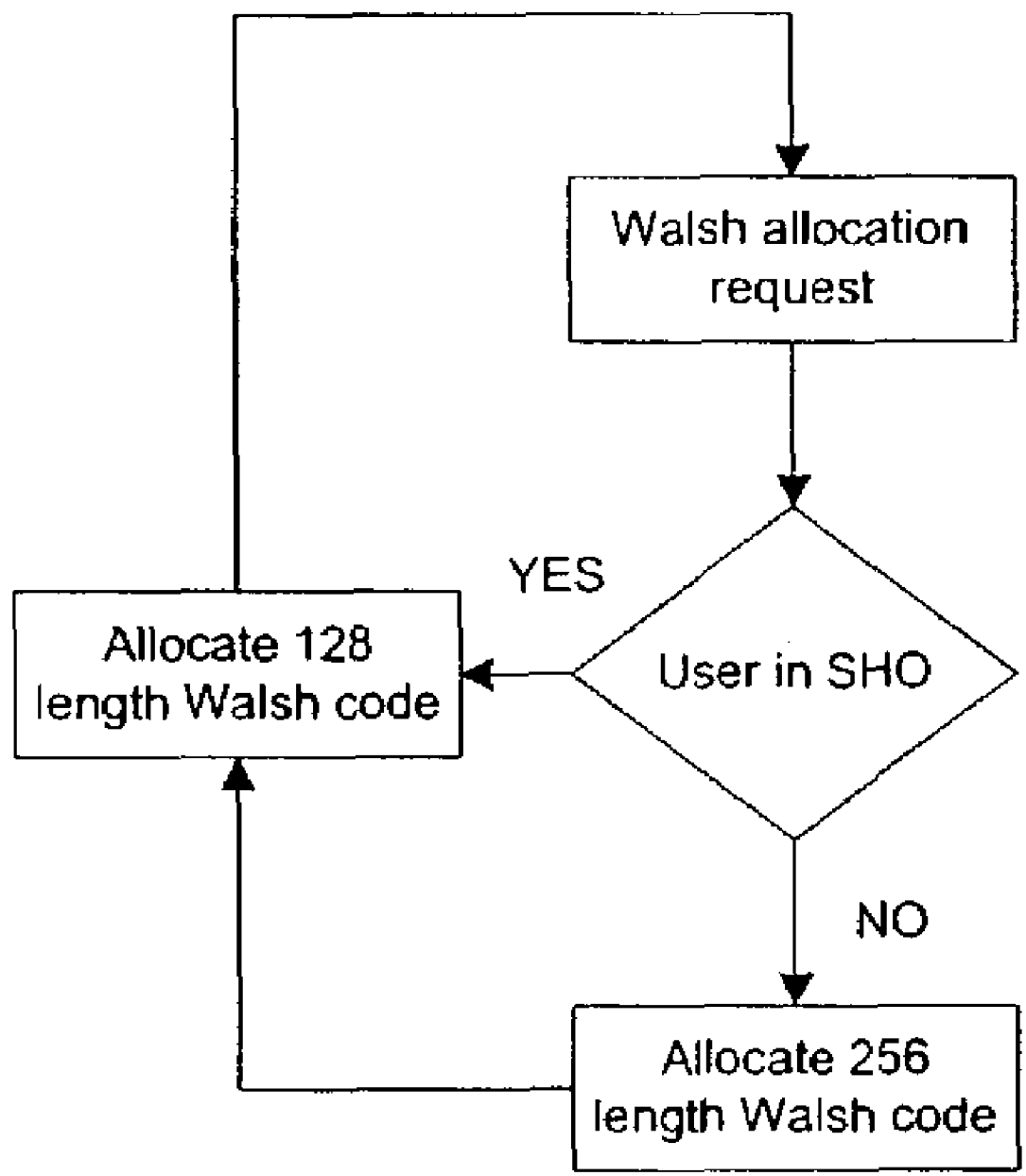
FIG. 5 depicts a flow chart of another embodiment of the present invention.

Referring to FIG. 5, an exemplary flow chart of another embodiment of the present invention is illustrated. In this flow chart, the determination of the allocation of Walsh codes may also be based on the soft handoff ("SHO") status of wireless units. Consequently, the users in SHO can be allocated smaller length Walsh codes that allow for a more robust modulation and coding, while users not in SHO can be allocated larger length Walsh codes.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of wireless communication comprising:
receiving at least one quality condition signal from each of a plurality of voice channels; and
determining a spreading factor for each voice channel of the plurality on the downlink in response to the corresponding at least one quality condition signal, the length of the spreading factor being selected based on the value of the quality condition signal such that a higher value of the quality condition signal results in selection of a longer spreading code and a lower value of the quality condition signal results in selection of a shorter spreading code.

2. The method of claim 1, further comprising:
allocating a Walsh code to each voice channel in response to the determined corresponding spreading factor, each allocated spreading factor corresponding with one of a plurality of radio configurations.

3. The method of claim 2, wherein each allocated spreading factor corresponds with one of a plurality of radio configurations.

4. The method of claim 3, wherein the plurality of radio configurations comprise at least one RC1, RC2, RC3 and RC4.

5. The method of claim 1, wherein the quality condition signal comprises a static condition measurement.

6. The method of claim 5, wherein the quality condition signal comprises a pilot signal strength measurement.

7. The method of claim 1, wherein the plurality comprises at least a first and a second voice channel, the quality condition signal of the first voice channel being higher relative to the quality condition signal of the second voice channel, and the spreading factor of the first voice channel being longer than the spreading factor of the second voice channel.

8. The method of claim 7, wherein the plurality comprises a third voice channel, the quality condition signal of the third voice channel being lower relative to the quality condition signal of the first voice channel and higher relative to the quality condition signal of the second voice channel, and the spreading factor of the third voice channel being longer than the spreading factor of the second voice channel and shorter than the spreading factor of the first voice channel.

9. A method of wireless communication comprising:
transmitting at least one quality condition signal from at least one voice user; and
receiving a determined spreading factor for the at least one voice user on the downlink in response to the at least one quality condition signal, the length of the spreading factor being selected based on the value of the quality condition signal such that a higher value of the quality condition signal results in selection of a longer spreading code and a lower value of the quality condition signal results in selection of a shorter spreading code.

10. The method of claim 9, further comprising: receiving an allocated Walsh code for the at least one voice use in response to the determined corresponding spreading factor.

11. The method of claim 10, wherein each allocated spreading factor corresponds with one of a plurality of radio configurations.

12. The method of claim 11, wherein the plurality of radio configurations comprise at least one RC1, RC2, RC3 and RC4.

13. The method of claim 9, wherein the quality condition signal comprises a static condition measurement.

14. The method of claim 13, wherein the quality condition signal comprises a pilot signal strength measurement.

15. The method of claim 9, wherein said at least one voice user comprises at least a first and a second voice user, the quality condition signal of the first voice user being higher relative to the quality condition signal of the second voice user, and the spreading factor of the first voice user being longer than the spreading factor of the second voice user.

16. The method of claim 15, wherein said at least one voice user comprises a third voice user, the quality condition signal of the third voice user being lower relative to the quality condition signal of the first voice user and higher relative to the quality condition signal of the second voice user, and the spreading factor of the third voice user being longer than the spreading factor of the second voice user and shorter than the spreading factor of the first voice user.

* * * * *